(12) United States Patent
Lachine et al.

(10) Patent No.: US 9,299,166 B2
(45) Date of Patent: Mar. 29, 2016

(54) IMAGE COMPRESSION METHOD AND APPARATUS FOR BANDWIDTH SAVING

(71) Applicant: QUALCOMM Incorporated, San Diego, CA (US)

(72) Inventors: Vladimir Lachine, Toronto (CA); Chon-Tam Le Dinh, Montreal (CA); Dinh Kha Le, Montreal (CA); Jeffrey Kar Fai Wong, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 13/713,742

(22) Filed: Dec. 13, 2012

(65) Prior Publication Data

US 2014/0169480 A1 Jun. 19, 2014

(51) Int. Cl.

| | |
|---|---|
| *G06T 9/00* | (2006.01) |
| *H04N 19/176* | (2014.01) |
| *H04N 19/46* | (2014.01) |
| *H04N 19/15* | (2014.01) |
| *H04N 19/593* | (2014.01) |
| *H04N 19/12* | (2014.01) |
| *H04N 19/124* | (2014.01) |
| *H04N 19/91* | (2014.01) |
| *H04N 19/14* | (2014.01) |
| *H04N 19/174* | (2014.01) |
| *H04N 19/423* | (2014.01) |
| *H04N 19/436* | (2014.01) |

(52) U.S. Cl.
CPC *G06T 9/00* (2013.01); *H04N 19/12* (2014.11); *H04N 19/124* (2014.11); *H04N 19/14* (2014.11); *H04N 19/15* (2014.11); *H04N 19/174* (2014.11); *H04N 19/176* (2014.11); *H04N 19/423* (2014.11); *H04N 19/436* (2014.11); *H04N 19/46* (2014.11); *H04N 19/593* (2014.11); *H04N 19/91* (2014.11)

(58) Field of Classification Search
None
See application file for complete search history.

(56) References Cited

U.S. PATENT DOCUMENTS

| 6,385,345 | B1 | 5/2002 | Ribas-Corbera et al. |
|---|---|---|---|
| 6,870,883 | B2 * | 3/2005 | Iwata ............... H04N 19/61 375/240.01 |
| 8,229,235 | B2 | 7/2012 | Kim et al. |

(Continued)

FOREIGN PATENT DOCUMENTS

EP 0782341 A2 7/1997

OTHER PUBLICATIONS

Wiegand et al. ("Overview of the H.264/AVC Video Coding Standard" IEEE Trans. on Circuits and System for Video Technology. vo. 13, No. 7 Jul. 2003).*

(Continued)

*Primary Examiner* — Kate Luo
(74) *Attorney, Agent, or Firm* — Knobbe, Martens, Olson & Bear LLP

(57) ABSTRACT

Described herein are methods and devices that employ parallel compression of image data using a lossless compressor and a quantization compressor. As described, the lossless compressor generates a variable length compressed bit stream and the quantization compressor generates a fixed length compressed bit stream. The fixed length bit stream is always equal in size to a size requirement of an output memory block. The variable length bit stream may be stored in the output memory block unless it exceeds the memory requirement in size, in which case the fixed length bit stream may be stored to the output memory block.

35 Claims, 5 Drawing Sheets

(56) References Cited

U.S. PATENT DOCUMENTS

| | | | |
|---|---|---|---|
| 2003/0210163 A1* | 11/2003 | Yang | H03M 7/40 341/67 |
| 2006/0028686 A1* | 2/2006 | Bergman | H04N 19/176 358/2.1 |
| 2006/0274833 A1* | 12/2006 | Kojokaro | H04N 19/139 375/240.16 |
| 2007/0098283 A1 | 5/2007 | Kim et al. | |
| 2007/0269116 A1* | 11/2007 | Lo | H04N 19/176 382/232 |
| 2008/0175475 A1 | 7/2008 | Sung | |
| 2010/0074322 A1* | 3/2010 | Terashima | G06G 5/36 375/240.01 |
| 2010/0254617 A1* | 10/2010 | Hwang | G06T 3/602 382/232 |
| 2010/0296745 A1 | 11/2010 | Strom et al. | |
| 2011/0123127 A1 | 5/2011 | Mima et al. | |
| 2011/0194616 A1 | 8/2011 | He et al. | |

OTHER PUBLICATIONS

International Search Report and Written Opinion—PCT/US2013/066633—ISA/EPO—Mar. 31, 2014.

Liu, Y., et al., "Lossy and lossless spectral image compression using quaternion Fourier, Burrows-Wheeler and Move- to-Front transforms", Signal Processing (ICSP), 2012 IEEE 11th International Conference on, IEEE, Oct. 21, 2012, pp. 619-622, XP032353231, DOI: 10.1109/ICOSP.2012.6491564, ISBN: 978-1-4673-2196-9, Sections I, IV and V.

Partial International Search Report—PCT/US2013/066633—ISA/EPO—Jan. 8, 2014.

Penrose, A.J., "Extending Lossless Image compression", Technical Report No. 526, Jan. 1, 2001, pp. 1-148, XP55004806, Retrieved from the Internet: URL:http://www.cl.cam.ac.uk/techreports/UCAM-CL-TR-526.pdf, [retrieved on Aug. 15, 2011], Chapter 2.

Ruiz., G.A., et al., "An efficient VLSI processor chip for variable block size integer motion estimation in H.264/AVC", Signal Processing. Image Communication, Elsevier Science Publishers, Amsterdam, NL, vol. 26, No. 6, Apr. 13, 2011, pp. 289-303, XP028374316, ISSN: 0923-5965, DOI: 10.1016/J.IMAGE.2011.04.006, [retrieved on Apr. 28, 2011], Sections 3 and 3.1 with figure 6.

Weinberger M.J., et al., "The LOCO-I Lossless Image Compression Algorithm: Principles and Standardization into JPEG-LS", IEEE Transactions on Image Processing, IEEE Service Center, Piscataway, NJ, US, vol. 9, No. 8, Aug. 1, 2000, pp. 1309-1324, XP011025643, ISSN: 1057-7149. DOI: 10.1109/83.855427, Sections III.A and III.C.

Wen, J., et al., "Reversible variable length codes for robust image and video transmission", Signals, Systems & Computers, 1997, Conference Record of the Thirty-First Asilomar Conference on Pacific Grove, CA, USA Nov. 2-5, 1997, Los Alamitos, CA, USA, IEEE Comput. Soc, US, Nov. 2, 1997, pp. 973-979, vol. 2, XP032140322, DOI: 10.1109/ACSSC.1997.679052 ISBN: 978-0-8186-8316-9, Section II.

Bentley, et al., "A Locally Adaptive Data Compression Scheme," Communications of the ACM, 29 (4), pp. 320-330 (1986).

ITU-T. ISO DIS 10918-1, "Digital compression and coding of continuous-tone still images (JPEG)". Recommendation T.81, pp. 1-189 (2004).

Sayood, et al., "A Differential Lossless Image Compression Scheme," IEEE Transactions on Signal Processing, 40 (1), pp. 236-241 (1992).

* cited by examiner

OUTPUT MEMORY BLOCK FORMAT

IMAGE COMPRESSION METHOD AND APPARATUS FOR BANDWIDTH SAVING

TECHNICAL FIELD

The present embodiments relate to video display processors, and in particular, to methods and apparatus for video compression.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implemented such video coding techniques.

In the world of telecommunications, where bandwidth is a fundamental limitation, video compression plays an important role in multimedia applications. Video compression can be used to dramatically decrease the information required to represent an image by eliminating redundant and non-essential material. Video compression techniques generally perform spatial prediction, motion estimation, and motion compensation to reduce or remove redundancy inherent in video data. Intra prediction video coding relies on spatial prediction to reduce or remove spatial redundancy in video within a given video frame. However, high bandwidth is generally necessary to produce acceptable audio and video quality. With complication of video processing algorithms and increasing bit width of video signals, there is an increased need for saving signal bandwidth in video processors.

SUMMARY

According to an embodiment, a bandwidth and memory compression circuit for encoding a plurality of pixels comprises a lossless compressor configured to generate a variable length bit stream of a first size; a quantization compressor configured to generate a fixed length bit stream of a second size; an output memory block having a predetermined size; and wherein the output memory block is configured to store the variable length bit stream if the first size is smaller than or equal to the predetermined size and is configured to store the fixed length bit stream if the first size is greater than the predetermined size.

BRIEF DESCRIPTION OF THE DRAWINGS

Various aspects of video compression are illustrated by way of example, and not by way of limitation, in the accompanying drawings, wherein.

DETAILED DESCRIPTION

Figure 1:
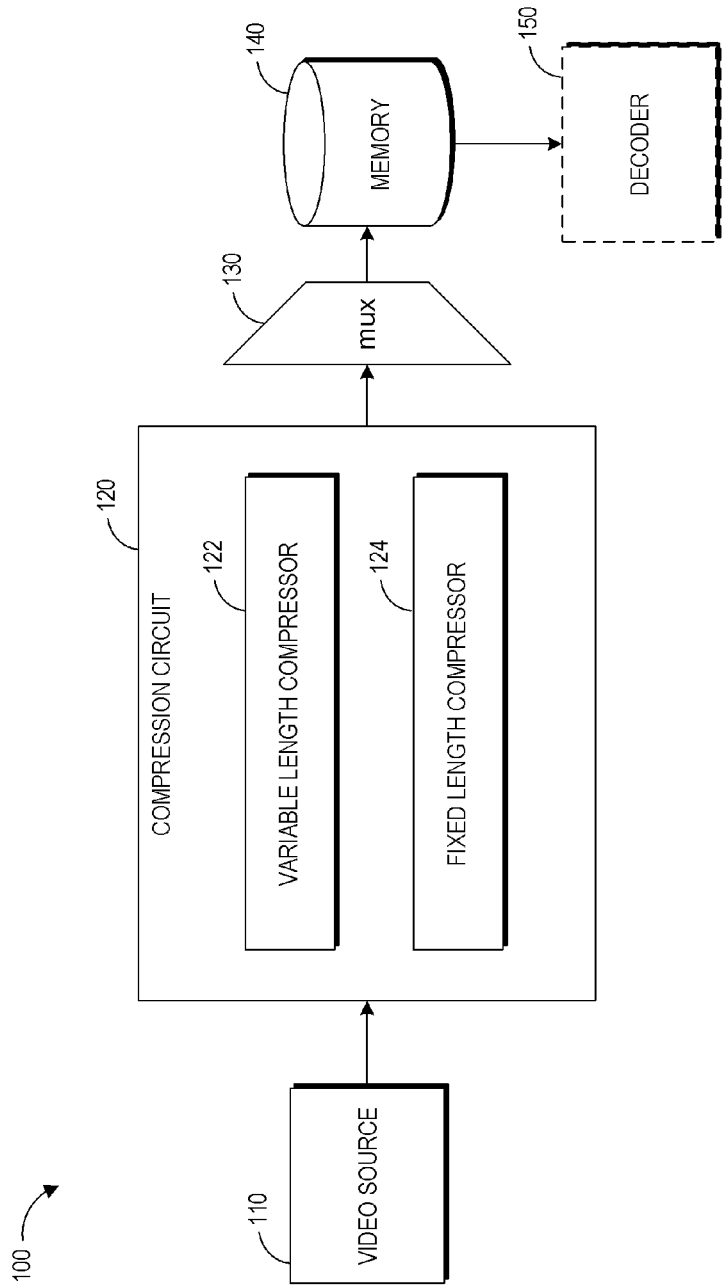
FIG. 1 illustrates an embodiment of a bandwidth compression circuit.

Embodiments of image compression techniques described herein provide for parallel compression of an input bit stream using a hardware implementation comprising a relatively small number of gates in order to produce an output video bit stream having a fixed compression rate per tile and substantially visually lossless quality. A video bit stream comprises a plurality of images, or frames, each image being made up of a plurality of pixels. Each image is divided into tiles of a fixed number of pixels, and these tiles are sent through a bandwidth compressor for encoding.

In one embodiment, as described below, the bandwidth compressor uses at least two different compression circuits, one which generates a lossless bit stream of variable length and one which generates a fixed length bit stream matching a size requirement of an output memory block. The variable length bit stream is of lossless quality, but may be larger in size than the fixed length bit stream. The size of the variable length bit stream is compared to the size of the memory block, and if it is less than or equal to the memory block size then the compressor sends the variable length bit stream to the memory. However, if the variable length bit stream is larger than the memory block size, the fixed length bit stream is transmitted to the memory.

Embodiments described herein provide systems, methods and apparatus for image compression to save signal bandwidth in video processing devices. The techniques described employ a lossless compressor (LC) and a quantization compressor (QC) to compress the same tile of pixels in parallel, where the LC generates a variable length bit stream of lossless quality, while the QC generates a fixed length bit stream. The size of the bit stream output by the LC may be less or greater than a required size of an output memory block. The QC is programmed to generate a bit stream that fits a predetermined size of an output memory block, but it doesn't guarantee lossless compression. Both output bit streams can be transmitted to a bandwidth compressor for comparing the output bit streams to the size of the output memory block, and the LC output bit stream is stored if its size is less or equal than the required size of an output memory block, otherwise the QC bit stream is stored. This technique enables the compression circuit to offer visually lossless quality for compression rates between 1.5× and 2.5× of the original size in some embodiments.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

In general, this disclosure is directed to architectures and techniques for video coding. The term "coding," as used herein, may refer to encoding, decoding or both. Although the techniques described in this disclosure may be applicable to a wide variety of practical applications, the disclosure will refer to digital video encoding and decoding for purposes of example and illustration.

I. Overview (FIG. 1)

Referring now to FIG. 1, an exemplary bandwidth compression circuit 100 will now be described in greater detail. As shown in FIG. 1, the bandwidth compression circuit 100 includes a video source 110, a compression circuit 120 including a variable length compressor 122 and a fixed length compressor 124, a multiplexer 130, and a memory 140. Some embodiments may optionally include a decoder 150.

Video source 110 may be any device capable of generating or storing video content, for example a camera, computer, mobile communications device, or video game server or console. Video source 110 may include a video capture device, such as one or more video cameras, a video archive containing previously captured video, or a live video feed from a video content provider. As a further alternative, video source 110 may generate computer graphics-based data as the source video, or a combination of live video and computer-generated video. In each case, the captured, pre-captured or computer-generated video may be coded by compression circuit 120 for transmission to memory 140.

Although embodiments are discussed herein in the context of video, the compression techniques may be applied to a variety of digital content, for example still images, speech or audio data, documents, games, data files, or combinations of two or more of video, image, speech and audio data. Accordingly, discussion of video encoding and decoding applications is provided for purposes of illustration and should not be considered limiting of the various aspects of the disclosure as broadly described herein.

A video sequence includes a series of video frames, which may be referred herein to as images. Compression circuit 120 operates on blocks, slices or tiles composed of video units, such as pixels, within individual video frames in order to encode the video data. The video slices, blocks or tiles may have fixed or varying sizes, and may differ in size according to a specified coding standard. A tile's size may be defined by parameters such as a compression rate such as 1.5 or 2.5, an output memory block size such as 512 bits, video signal bit width such as 8 or 10, and chroma subsampling format such as 4:4:4, 4:2:2 or 4:2:0. Certain embodiments may employ one of the following two combinations of the previously described parameters: 32×2 pixels for 8 bit signal bit width, 4:2:0 subsampling and a 1.5 compression rate; and 24×2 pixels for 10 bit signal bit width, 4:2:2 subsampling and 1.875 compression rate. A tile may have any number of rows as may be limited by a number of available line buffers. Preferably, a tile may have two rows for optimizing compression rate versus error. A tile may be comprised of a plurality of blocks, such as luma and chroma blocks. A block's size may be determined by the color subsampling format of the video content. For example, for 4:4:4 and 4:2:2 subsampling, a luma block may consist of 2×2 pixels and a chroma block may consist of 2×2 pixels. As another example, for 4:2:0 subsampling, a luma block may consist of 2×2 pixels and a chroma block may consist of 4×1 pixels.

Compression circuit 120, which may be referred to herein as a bandwidth compressor (BWC), may be used for bandwidth savings in video display processors. Compression circuit 120 may implement an intra frame tile based compression technique offering visually lossless quality for compression rates between 1.5 and 2.5, and may support RGB and YCbCr (4:4:4, 4:2:2 and 4:2:0) video formats for 8-bit and 10-bit video signals.

As shown in FIG. 1, the compression circuit 120 comprises a variable length compressor 122 and a fixed length compressor 124 which may operate in parallel to generate output bit streams for tiles of pixels. Variable length compressor 122 and fixed length compressor 124 may each generate an output bit stream for the same tile, and one of the output bit streams may be transmitted for storage in memory 140. Memory 140 may comprise a plurality of output memory blocks of a predetermined size, where the output bit stream for each tile is stored in an output memory block.

The size of a variable length output bit stream generated for a tile by the variable length compressor 122 may be less or greater than a required size of an output memory block. Variable length compressor 122 may support lossless encoding. The fixed length compressor 124 may be configured to generate a fixed length output bit stream that fits the required size of an output memory block, but may not support lossless mode. The multiplexer 130 (or MUX) may be configured to select one of the variable length bit stream or fixed length bit stream and to forward the selected bit stream to memory 140. Which output bit stream the multiplexer 130 selects to be transmitted for a tile may depend at least partly on the size of the variable length output bit stream generated for the tile by the variable length compressor 122. The variable length output bit stream is selected for transmission if its size is less or equal than the required size of the output memory block, otherwise the fixed length output bit stream selected for transmission.

The variable length compressor 122 may compress a tile on a pixel by pixel basis. A difference between a pixel's original value and the pixel's predicted value for each pixel of the tile may be encoded as prefix and suffix The prefix may be encoded by means of variable length code, and the suffix may be encoded as is.

The fixed length compressor 124 may provide an alternate compression for a tile which is not encoded successfully by the variable length compressor 122. Successful encoding may be wherein the output bit stream is within the size limitation of an output memory block. The fixed length compressor 124 may divide a tile of pixels into a set of blocks and quantize pixels of each block independently of the other blocks. The number of quantization bits for all pixels of a block may depend on a standard deviation calculated over the block. A difference between a pixel's value and the pixel's average value over the block may be quantized and transmitted.

Color images may be converted from RGB to YCbCr format before compression and then back to an RGB format after decompression. Because chroma components Cb and Cr are generally smoother than luma component Y for video content, an image compressed in YCbCr color space has less visual compression noise than the same image compressed in a RGB color space for the same compression rate. Therefore, both the variable length compressor 122 and fixed length compressor 124 will preferably operate on video images converted to a YCbCr format.

Certain embodiments may further include a decoder 150. For each tile, the decoder 150 may decode all bits in the output bit stream in order to reconstruct all of the pixels within the tile. A first bit may act as a flag indicating which mode of compression was used for the tile. For example, a value of zero for the first bit may indicate that the tile was encoded in lossless mode by variable length compressor 122, whereas a value of one may indicate that the tile was encoded in quantization mode by fixed length compressor 124. Depending upon the mode of compression used for the tile, decoder 150 may employ various techniques to decode the tile, as will be discussed in more detail below with reference to FIGS. 4A-C.

Video compression circuit 120 and decoder 150 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video compression circuit 120 and decoder 150 may be implemented at least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, video source 110 may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

II. Variable Length Compression Component (FIG. 2)

Figure 2:
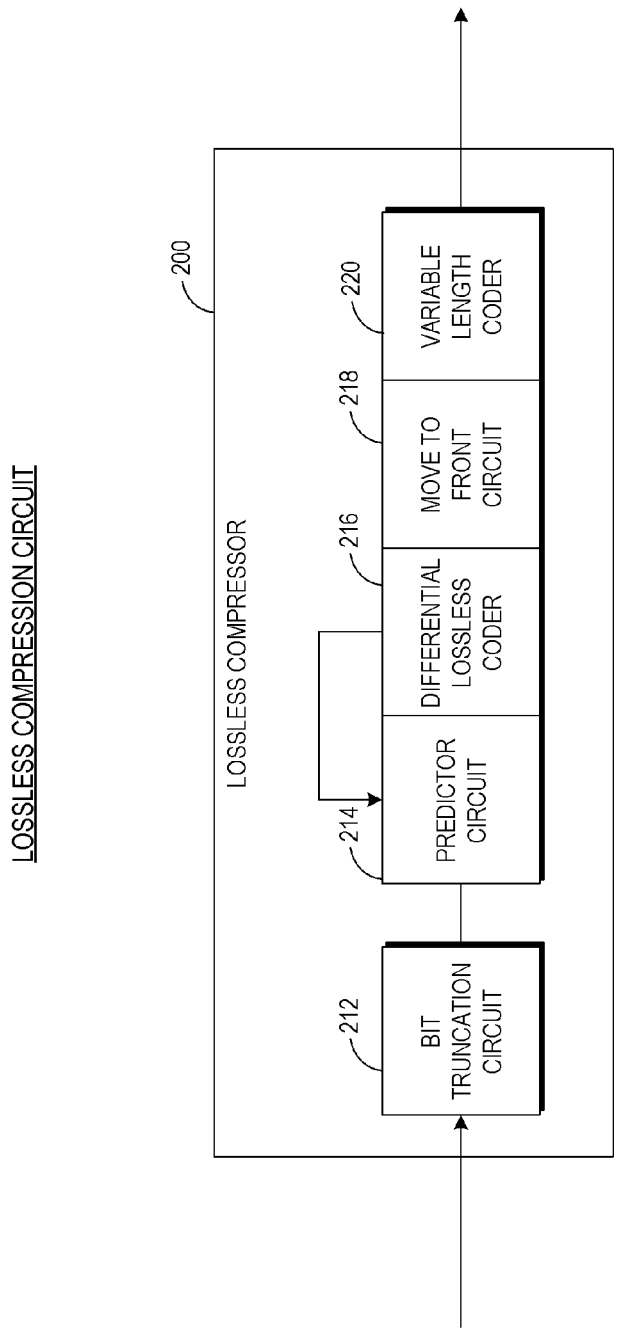
FIG. 2 illustrates an embodiment of a lossless compression circuit.

FIG. 2 is a block diagram illustrating an embodiment of a lossless compression circuit 200 which may be used as the variable length compressor 122 as shown in FIG. 1. Lossless compression circuit 200 may be formed at least in part as one or more integrated circuit devices, which may be referred to collectively as a circuit.

Lossless compression circuit 200 may be optimized for compression of video content, but it may not guarantee a fixed length for the resulting compressed output bit stream. The lossless compression circuit 200 may comprise a bit truncation (BT) circuit 212, a predictor circuit (PRD) 214, differential lossless coder (DLC) 216, a move to front circuit (MTF) 218 and a variable length coder (VLC) 220.

Prior to compression, the BT circuit 212 may truncate a few least significant bits (LSBs) of an input tile. For example, bit truncation mode may be used for a 10 bits video signal by dropping 1, 2 or 3 LSBs of the signal before compression, as dropping a few LSBs in a 10 bit signal generally may not affect perceptual image quality after decompression of the tile. In some embodiments, for instance in an image of YCbCr format, less bits may be truncated for luma component Y than for chroma components Cb and Cr. Each of three color components may be compressed independently of the other two.

The lossless compression circuit 200 may encode a difference between the original value of a pixel and a reference value of the pixel as prepared by DLC 216. This difference may be encoded as a variable length prefix and a fixed length suffix As an example, an image region or tile might have a top-left pixel encoded as a reference pixel value, and subsequent pixels may be encoded as differential pixel values representing the difference between the subsequent pixel and the reference pixel, or the difference between the subsequent pixel and a preceding pixel in an order of encoding dependency.

The DLC 216 may prepare the difference between an original value $P(x,y)$ and reference value $R(x,y)$ of any pixel with $(x,y)$ coordinates, and may encode the differential value as a prefix $PP(x,y)$ and a suffix $SP(x,y)$. The prefix $PP(x,y)$ may be encoded by variable length, and may be the number $N(x,y)$ of the least significant bits of the original value of the pixel being encoded $P(x,y)$ that are not identical to those of the reference pixel value $R(x,y)$. The suffix $SP(x,y)$ may be encoded as is, and may be the number $N(x,y)-1$ of least significant bits of $P(x,y)$.

The DLC 216 may employ the PRD circuit 214 to generate the reference pixel value $R(x,y)$ for each pixel. The value of a first pixel of a first row in a tile may be saved as is. The value of this first pixel may in some embodiments be encoded as the reference pixel value $R(x,y)$. In other embodiments, for subsequent pixels one of two predictors $P_1(x,$ and $P_2(x,y)$ may be used as the pixel's reference value $R(x,y)$. The predictors may be calculated in some embodiments by the following set of equations:

first line of the tile:

$$P_1(x, y)=P(x-1, y), P_2(x, y)=P(x-2, y),$$

other lines of the tile:

$$P_1(x, y) = MED(P(x, y-1), P(x-1, y), P(x-1, y-1))$$

$$P_2(x, y) = P(x-2, y),$$

where $$MED(a, b, c) = \begin{cases} \min(a, b) & c \geq \max(a, b) \\ \max(a, b) & c \leq \min(a, b) \\ a + b - c & \text{otherwise} \end{cases}$$

The lossless compression circuit 200 may also employ the PRD circuit 214 in order to minimize the suffix length by switching between a plurality of predictors. In the example above, after encoding the current pixel with a first predictor $P_1(x,y)$, the PRD circuit may switch to the other predictor $P_2(x,y)$ if the length of the encoded suffix is greater than a threshold in order to minimize the suffix length.

After a prefix and suffix for the differential value are generated by the DLC circuit 216, lossless compression circuit 200 may transmit the prefix to the MTF circuit 218 to perform techniques that will reduce the length of the output bit stream. As the prefix value is encoded by means of variable length code, the most frequently occurring symbols may be encoded with the fewest number of bits using a move-to-front transformation. A move-to-front transformation is a technique which does not compress data but can help to reduce redundancy in a data stream, such as the variable length output bit stream generated by lossless compression circuit 200, where a symbol which has been recently seen in the data stream appears again.

To reduce redundancy in the prefix portion of the output bit stream, thereby reducing the length of the variable length prefix, the MTF circuit 218 may generate a table, or codebook alphabet, of all symbols which occur in the prefix. Instead of outputting the symbols in the prefix, the MTF circuit 218 may output a code which refers to the position of each symbol in the table. The MTF circuit 218 may move frequently occurring symbols to the front of the table or codebook alphabet.

Because recently used symbols stay towards the front of the list, frequently occurring symbols on the prefix will result in a large number of small numbers such as "0"s and "1"s in the output.

The code output by the MTF circuit 218 may be further encoded by the VLC 220 as variable length Golomb-Rice codes. Golomb-Rice coding involves dividing a given input stream by a number to form a quotient and reminder and then coding the quotient using a unary code and the remainder using a Rice code or any other binary coding scheme. For example, a positive number x to be encoded may be broken into two parts, depending on a parameter k. The first part contains a unary encoding of x/2k while the second part contains the k least significant bits of x. The two parts are separated by a 0-bit, so the end of the unary encoding can be detected. Golomb-Rice codes are particularly efficient when the values being encoded follow an exponentially decaying probability distribution and the parameter k is determined correctly from the mean and variance of the distribution. Therefore, encoding the output of the MTF circuit 218 with Golomb-Rice coding is likely to reduce the output bit stream length. The prefixes are thus encoded using fewer bits than the original presentation without the loss of any information.

When storing the output bit stream for a tile to the output memory block in lossless compression mode, a first bit in the bit stream may serve a flag indicating that it was saved in lossless compression mode. In some embodiments, variable codes for all pixels of a tile may be saved in output memory block in the following order: the codes for luma component Y and then codes for chroma components Cb and Cr may be saved in interleaved order; for even rows, bits may be saved in normal order and for odd rows, bits may be saved in reverse order. This arrangement allows the coder and decoder to process pixels of two rows in parallel.

III. Fixed Length Compression Component (FIG. 3)

Figure 3:
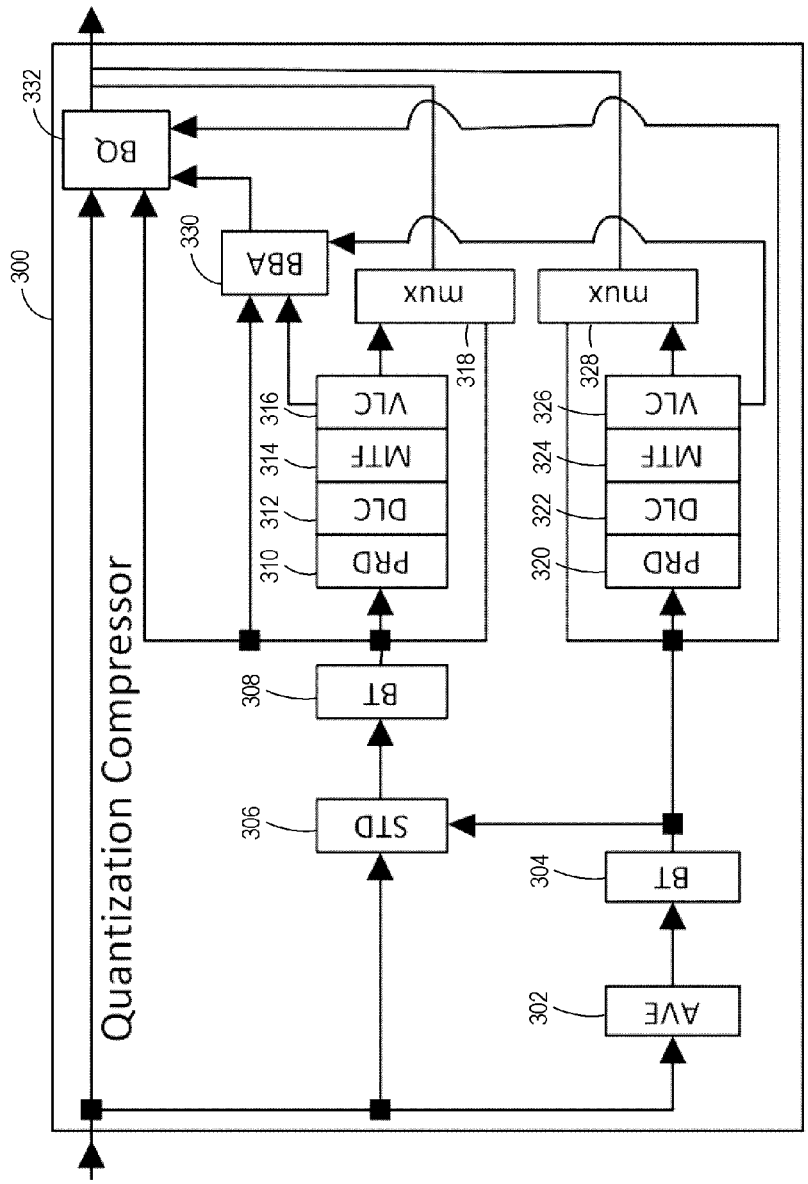
FIG. 3 illustrates an embodiment of a quantization compression circuit.

FIG. 3 is a block diagram illustrating an embodiment of a quantization compression circuit 300 which may be used as the fixed length compressor 124 as shown in FIG. 1. Quantization compression circuit 300 may be formed at least in part as one or more integrated circuit devices, which may be referred to collectively as a circuit.

The output bit stream generated by the quantization compression circuit 300 has the benefit of being able to output a bitstream that can fit the required size of the output memory block. However, the quantization compression circuit 300 may not support a lossless coding mode, so the quality of compression may be of visually inferior quality to that of the lossless compression circuit 200 of FIG. 2. Quantization is a lossy compression technique achieved by compressing a range of values to a single value in order to reduce the number of discrete symbols in a data stream. For example, reducing the number of colors required to represent an image or video frame makes it possible to reduce the size of the digital bit stream representing the image or video frame.

The quantization compression circuit 300 may comprise the following circuits: an average calculator (AVE) 302, a standard deviation calculator (STD) 306, a plurality of bit truncation circuits (BT) 304, 308, a bits per block allocator (BBA) 330 and a block quantization circuit (BQ) 332. The quantization compression circuit 300 may further comprise some or all of the circuits used in the lossless compression circuit 200 of FIG. 2 for variable length encoding such as a plurality of predictor circuits (PRD) 310, 320, differential lossless coders (DLC) 312, 322, move to front circuits (MTF) 314, 324 and variable length coders (VLC) 316, 326. Quantization compression circuit 300 may further comprise a plurality of multiplexers 318, 328 for receiving multiple inputs and selecting one of the inputs for output.

The quantization compression circuit 300 may divide a tile of pixels within a video frame into a set of blocks of a predetermined size, for example blocks of 2×2 or 4×1 pixels, the block size depending at least in part on video signal format and the color components of the frame. The quantization compression circuit 300 may quantize each block independently of the other blocks. As examples, for video content having 4:4:4 or 4:2:2 color subsampling formats, all blocks for luma and chroma components may have 2×2 pixels, whereas for video content having 4:2:0 color subsampling format the blocks for luma components may have 2×2 pixels and the blocks for chroma components may have 4×1 pixels.

The AVE circuit 302 may calculate average values Ave(m) for the pixels over a block and the STD circuit 306 evaluates a standard deviation value StdD(m) of the pixels over the block, where m=[0,M−1] and M is a number of blocks in the tile. The Ave(m) and StD(m) values may be preliminary truncated by the BT circuits 304, 308 in a similar manner as discussed above with respect to FIG. 2, wherein a few least significant bits may be discarded. The truncated Ave(m) and StD(m) values for all blocks of the tile being compressed may then be encoded in parallel within the quantization compression circuit 300 by means of both fixed and variable length codes. The PRD circuits 310, 320 of the quantization compression circuit 300 may employ only one predictor, which may be the first left pixel R(x,y)=P(x,y−1). The smallest of the two bit streams generated within the quantization compression circuit 300 (encoded by fixed or variable length codes) may be selected by the multiplexing circuitry 318, 328 and transmitted to the BBA circuit 330 before being saved in the output memory block.

After this step, there may be unused bits in the output memory block that may be assigned for compression of the pixels of all blocks. The BBA circuit 330 may assign a number of quantization bits for each block of the tile based on standard deviation of the pixel values in the block, and may also be configured to share available bits between all blocks of a tile. First, the BBA circuit 330 may initialize an array of available bits for all pairs of blocks. Then the BBA may sort the blocks in a tile by standard deviation values in ascending order and form pairs of the blocks by coupling together blocks with the greatest and smallest standard deviation values. The bits assigned for a pair of blocks are then shared between two blocks of a pair in such a way that the block with the largest standard deviation value in the pair gets more bits than the block with the smallest standard deviation value.

For each block, the BQ circuit 332 may calculate a quantization step for the block based at least in part on the number of assigned quantization bits and the standard deviation value of the block. For each pixel in each block, the BQ circuit 332 may calculate a difference between the pixel's value and average value of the pixels over the block and then may save the quantized difference into the output memory block. Divider or shifter may be used as the quantization means. When storing to the output memory block in quantization compression mode, a first bit in the output bit stream for each tile may serve a flag indicating that it was saved in quantization compression mode, and the remainder of the output memory block may be divided into three parts, as will be discussed in more detail below with respect to FIG. 4C.

IV. Output Memory Component (FIGS. 4A-C)

Figure 4A:
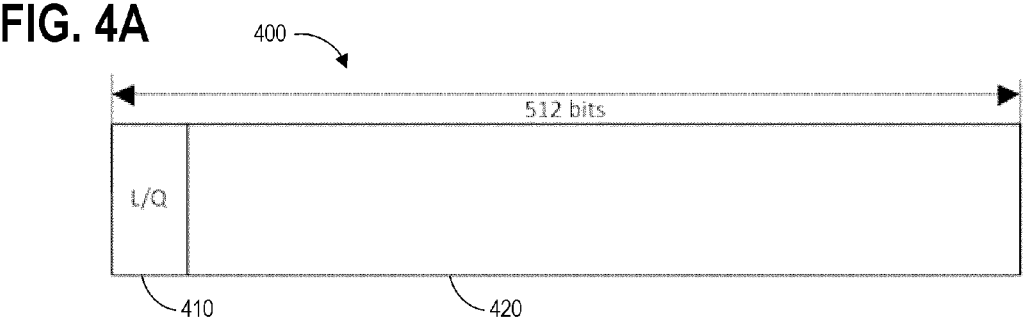
FIGS. 4A-C illustrate embodiments of an output memory block format.
Figure 4B:
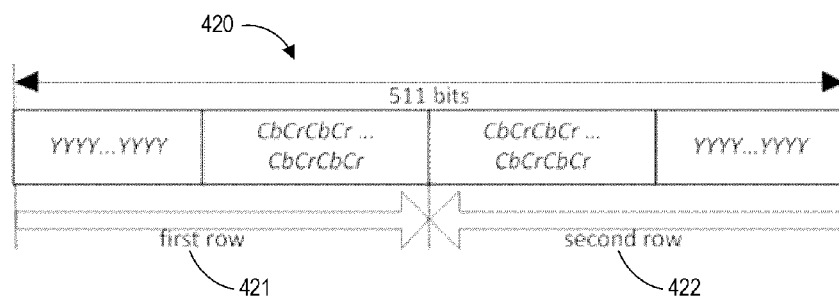
Figure 4C:
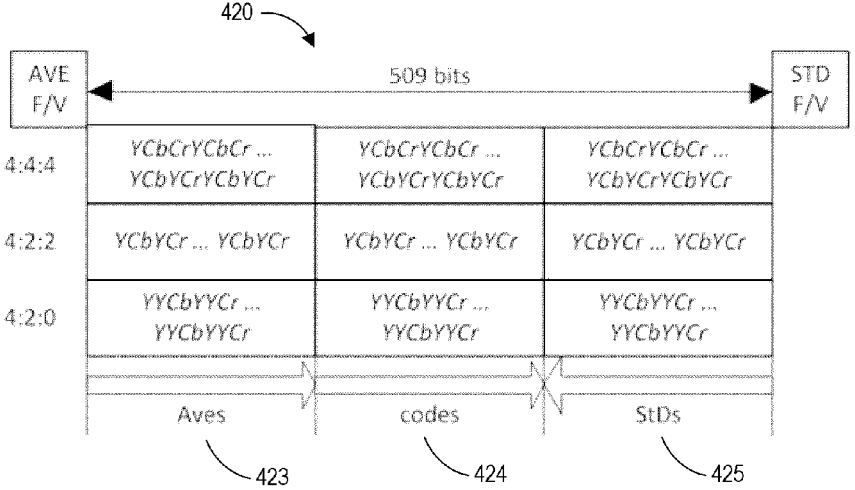

FIGS. 4A-C illustrate embodiments of an output memory block format for storing the bit stream generated by the compression techniques described herein, and may be implemented in memory 140 of FIG. 1.

FIG. 4A shows an embodiment of the overall format of output memory block 400, which may be divided into two portions. As illustrated, the memory block 400 is 512 bits, but this is meant to illustrate and not limit the disclosure, as the memory block 400 may be a variety of bit lengths. The first portion of the memory block is indication bit 410. Indication bit 410 may be a single bit used to indicate whether the following stored bit stream was compressed using the lossless compression circuit 200 or quantization compression circuit 300 as described above in FIGS. 2 and 3. In some embodiments, a "0" may be used to indicate that the stored bit stream was compressed using the lossless compression circuit 200 and a "1" may be used to indicate that the stored bit stream was compressed using quantization compression circuit 300. The second portion 420 may be used to store the output bit stream from the compression circuit 120 of FIG. 1.

The format of the output bit stream portion 420 will vary depending upon whether the output bit stream was compressed in lossless or quantization compression mode. FIG. 4B illustrates one embodiment of output bit stream portion 420 configured to store the output of a tile compression from lossless compression circuit 200. In lossless compression mode, variable codes for all pixels of the tile may be saved in output memory block according to the following guidelines. First, the codes for luma component Y and then codes for chroma components Cb and Cr may be saved in interleaved order. For even rows, bits may be saved in a first order as in component 421, for example from left to right, while for odd rows, bits may be saved in a second order which may be the reverse order of the first order as in component 422, for example from right to left. This "mirrored" arrangement of the output bit stream 420 allows the coder and decoder to process pixels of two rows in parallel.

FIG. 4C illustrates an embodiment of output bit stream portion 420 configured to store the output of a tile compressed by quantization compression circuit 300. The output bit stream portion 420 may be divided into three portions. The first portion of the output memory block may be an averages storing component 423 comprising a first bit indicating whether the tile was encoding using fixed or variable coding within quantization compression circuit 300, and may further comprise a string of bits containing the data representing the average values over the blocks of a tile. The second portion may be a quantization component 424, which may contain fixed quantization codes for all pixels of the blocks of the compressed tile. The third part of output bit stream portion 420 may be standard deviation component 425, which may comprise codes for the standard deviation values over the blocks of the compressed tile, and which may also contain a last bit indicating whether the standard deviations are fixed or variable. The third portion may be saved in reverse order, from right to left, in order to allow the coder and decoder to process average and standard deviation values in parallel.

V. Image Compression Process (FIG. V)

Figure 5:
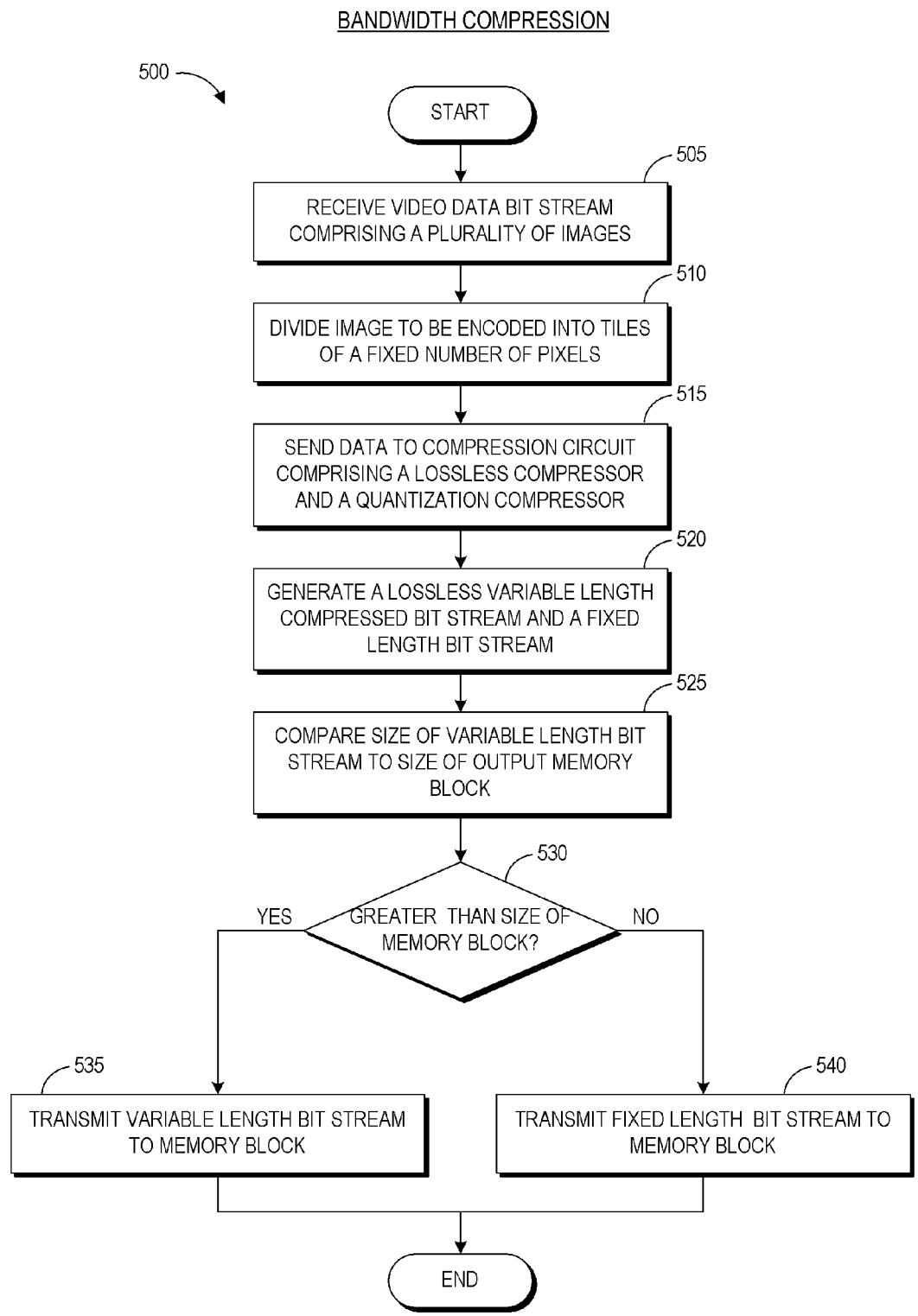
FIG. 5 illustrates an embodiment of an image compression process.

FIG. 5 illustrates an embodiment of an image compression process 500 which may be carried out by the video compression circuit 120 of FIG. 1.

The process 500 begins at step 505 where the compression circuit 120 receives a video data bit stream comprising a plurality of video frames or images from video source 110. The process 500 then moves to block 510 wherein the image is divided into a plurality of tiles, each tile comprising a fixed number of pixels. As discussed above, the plurality of tiles may be of fixed or varying sizes, and may differ in size according to a specified coding standard. A tile size may be defined by parameters such as a compression rate, an output memory block size, video signal bit width, and color subsampling format. Certain embodiments may employ one of the following two combinations of the previously described parameters: a tile size of 32×2 pixels for 8 bit signal bit width, 4:2:0 color subsampling rate, and 1.5 compression rate; and a tile size of 24×2 pixels for 10 bit signal bit width, 4:2:2 color subsampling rate, and 1.875 compression rate. A tile may have any number of rows as may be limited by a number of available line buffers. A tile may be further divided into of a plurality of blocks, such as luma and chroma blocks. A block's size may be determined by the color subsampling format of the video content. For example, for 4:4:4 and 4:2:2 subsampling, a luma block may consist of 2×2 pixels and a chroma block may consist of 2×2 pixels. As another example, for 4:2:0 subsampling, a luma block may consist of 2×2 pixels and a chroma block may consist of 4×1 pixels.

After dividing the image into a plurality of tiles, the process 500 transitions to block 515 in which the tile data is sent through the lossless compression circuit 200 and quantization compression circuit 300. The process 500 is then able to, at block 520, generate both a variable length output bit stream and a fixed length output bit stream representing alternate compressions of each tile. The process 500 then moves to block 525, in which the size of the variable length bit stream is compared to a size requirement of an output memory block. The output memory block may be a subset of memory 140 of FIG. 1, which may comprise a plurality of output memory blocks wherein each output memory block is configured to store a compressed tile.

The process 500 then transitions to decision block 530. If the process 500 determines at decision block 530 that the size of the variable length bit stream is not greater than the size of the output memory block, the process 500 transitions to block 535 where the variable length bit stream is transmitted to the output memory block for storage. However, if the process 500 determines that variable length bit stream is greater in size than the output memory block, then the process 500 moves to block 540 in which the fixed length bit stream output by quantization compression circuit 300 may be transmitted for storage in the output memory block.

VI. Terminology

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as touchscreen controller, a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An image compression circuit for encoding an image comprising a plurality of pixels, the circuit comprising:
   a lossless compressor configured to generate a variable length bit stream of a first size from a tile of pixels from the image, wherein the lossless compressor is configured to save bits for even rows in a first direction, and for odd rows in a second direction that is reverse of the first direction;
   a quantization compressor configured to generate a fixed length bit stream of a second size from the tile of pixels, wherein the lossless compressor and the quantization compressor operate in parallel;
   an output memory block having a predetermined size; and
   a bandwidth compressor configured to store the variable length bit stream in the memory block if the first size is smaller than or equal to the predetermined size and is configured to store the fixed length bit stream in the memory block if the first size is greater than the predetermined size.

2. The circuit of claim 1, wherein the second size of the fixed length bit stream is equal to the predetermined size of the output memory block.

3. The circuit of claim 1, the lossless compressor further comprising a bit truncation, predictor circuit, a differential lossless coding circuit, a move to front circuit, and a variable length coding circuit.

4. The circuit of claim 3, wherein the differential lossless coding circuit prepares a difference between an original value of a pixel and a predicted value of the pixel.

5. The circuit of claim 3, wherein the lossless coding circuit encodes the difference between an original value and the predicted value as a prefix and a suffix.

6. The circuit of claim 3, wherein the predictor circuit minimizes a length of the suffix by switching between a plurality of predictors.

7. The circuit of claim 3, wherein the move to front circuit reduces a length of the prefix by moving frequently occurring symbols to the front of a codebook alphabet.

8. The circuit of claim 3, wherein the variable length encoding circuit encodes the output of the move to front circuit.

9. The circuit of claim 1, the quantization compressor further comprising an average calculation circuit, a standard deviation calculation circuit, a bit truncation circuit, a bits per block allocation circuit, and a block quantization circuit.

10. The circuit of claim 9, wherein the average calculation circuit calculates an average value of each block in the tile of pixels being encoded.

11. The circuit of claim 9, wherein the standard deviation calculation circuit calculates a standard deviation value of each block in the tile of pixels.

12. The circuit of claim 9, wherein the bit truncation circuit may truncate the average and standard deviation values.

13. The circuit of claim 9, further comprising a predictor circuit.

14. The circuit of claim 9, wherein the block quantization circuit is configured to determine the numbers of quantization bits for each block in a tile to be encoded is determined by the following procedure:
   initialize an array of available bits for all pairs of blocks,
   sort the blocks in a tile by standard deviation values in ascending order,
   form pairs of blocks from a first block with the largest standard deviation value, a second block with smallest standard deviation value, and a next pair of blocks from the remaining blocks in the tile by coupling together blocks with largest and smallest standard deviation values, until all blocks in the tile are coupled; and
   share the available bits per a pair of blocks by assigning more bits to a block among a block pair to another block with the greatest standard deviation value.

15. The circuit of claim 1, wherein the bandwidth and memory compression circuit produces visually lossless quality for compression rates between 1.5 and 2.5.

16. The circuit of claim 1, wherein the lossless compressor is configured to save codes for a luma component and codes for two chroma components in an interleaved order.

17. The circuit of claim 1, wherein the variable length compressor is configured to save bits for even rows from left to right, and for odd rows from right to left.

18. The circuit of claim 1, further comprising a multiplexer configured to:
   compare the first size of the variable length bit stream to the predetermined size of the output memory block;
   in response to determining that the first size of the variable length bit stream is less than or equal to the predetermined size of the output memory block, forward the variable length bit stream to the output memory block; and
   in response to determining that the first size of the variable length bit stream is not less than or equal to the predetermined size of the output memory block, forward the fixed length bit stream to the output memory block.

19. A computer-implemented method of image compression for conserving bandwidth in video processing devices, the method comprising:
   generating a variable length bit stream representing a first compression of a tile of pixels, the variable length bit stream having a first size, wherein generating the variable length bit stream comprises saving bits for even rows in a first direction, and for odd rows in a second direction that is reverse of the first direction;

generating a fixed length bit stream representing a second compression of the tile of pixels, the fixed length bit stream having a second size;

comparing the first size of the variable length bit stream to the predetermined size of the output memory block; and storing the variable length bit stream in the output memory block if the first size of the variable length bit stream is smaller than or equal to the predetermined size of the output memory block, otherwise storing the fixed length bit stream in the output memory block.

20. The method of claim 19, further comprising storing the fixed length bit stream in the output memory block if the first size of the variable length bit stream is larger than the predetermined size of the output memory block.

21. The method of claim 19, wherein the second size of the fixed length bit stream equals the predetermined size of the output memory block.

22. The method of claim 19, wherein generating a variable length bit stream is optimized for video content.

23. The method of claim 19, wherein generating a fixed length bit stream further comprises the steps of dividing the tile of pixels into a set of blocks and quantizing each block independently of the other blocks.

24. The method of claim 19, further comprising placing a first bit in the bit stream stored in the output memory block, the first bit indicating whether the stored bit stream is the variable length or fixed length bit stream.

25. A non-transitory computer-readable medium comprising code that, when executed, causes an processor to perform the method of:

performing at least two parallel compressions of a tile of pixels, a first compression comprising a variable length bit stream having a first size and a second compression comprising a fixed length bit stream of a second size, wherein the first compression generates the variable length bit stream by saving bits for even rows in a first direction and for odd rows in a second direction that is reverse of the first direction;

comparing the first size of the variable length bit stream to a predetermined size of an output memory block; and storing the variable length bit stream in the output memory block if the first size of the variable length bit stream is smaller than or equal to the predetermined size of the output memory block.

26. The non-transitory computer-readable medium of claim 25, wherein the second size of the fixed length bit stream is equal to the size of the output memory block.

27. The non-transitory computer-readable medium of claim 25, further comprising storing the fixed length bit stream in the output memory block if the first size of the variable length bit stream is larger than the predetermined size of the output memory block.

28. The non-transitory computer-readable medium of claim 25, further comprising inserting a first bit at the beginning of the bit stream stored in the output memory block, the first bit indicating whether the stored bit stream is the variable length or fixed length bit stream.

29. The non-transitory computer-readable medium of claim 25, wherein the step of performing two parallel compressions is carried out by a lossless compressor and a quantization compressor.

30. An apparatus for compressing data, comprising:

means for generating a variable length bit stream of a first size, wherein generating the variable length bit stream comprises saving bits for even rows in a first direction, and for odd rows in a second direction that is reverse of the first direction;

means for generating a fixed length bit stream of a second size;

means for comparing the first size of the variable length bit stream to a predetermined size; and means for storing either the variable length bit stream or the fixed length bit stream.

31. The apparatus of claim 30, wherein the variable length bit stream and the fixed length bit stream represent alternate compressions of a tile of pixels.

32. The apparatus of claim 30, wherein the means for generating a variable length bit stream comprises a lossless compression circuit.

33. The apparatus of claim 30, wherein the means for generating a fixed length bit stream comprises a quantization compression circuit.

34. The apparatus of claim 30, wherein the means for storing either the variable length bit stream or the fixed length bit stream comprises an output memory block of the predetermined size.

35. The apparatus of claim 30, wherein the second size is equal to the predetermined size.

* * * * *